(12) United States Patent
Chen et al.

(10) Patent No.: US 11,249,515 B2
(45) Date of Patent: Feb. 15, 2022

(54) HEAD-MOUNTED DISPLAY DEVICE

(71) Applicant: Quanta Computer Inc., Taoyuan (TW)

(72) Inventors: Chun-Lung Chen, Taoyuan (TW);
Yuan-Peng Yu, Taoyuan (TW);
Chun-Wen Wang, Taoyuan (TW);
Chia-Hsing Shih, Taoyuan (TW);
Hung-Chieh Wu, Taoyuan (TW);
Chang-En Tsai, Taoyuan (TW)

(73) Assignee: QUANTA COMPUTER INC.,
Taoyuan (TW)

( * ) Notice: Subject to any disclaimer, the term of this patent is extended or adjusted under 35 U.S.C. 154(b) by 0 days.

(21) Appl. No.: 16/943,424

(22) Filed: Jul. 30, 2020

(65) Prior Publication Data
US 2021/0255663 A1    Aug. 19, 2021

(30) Foreign Application Priority Data

Feb. 17, 2020   (TW) .................................. 109104908

(51) Int. Cl.
*G06F 1/16*    (2006.01)
(52) U.S. Cl.
CPC .................................. *G06F 1/163* (2013.01)
(58) Field of Classification Search
CPC .................................. G06F 1/163; H05K 5/00
See application file for complete search history.

(56) References Cited

U.S. PATENT DOCUMENTS

| 9,581,822 | B2 | 2/2017 | Morimoto | |
|---|---|---|---|---|
| 10,353,206 | B2 * | 7/2019 | Guo | ..................... H04R 5/0335 |
| 10,393,312 | B2 | 8/2019 | Pombo et al. | |
| 2006/0119539 | A1 * | 6/2006 | Kato | ................... G02B 27/0176 345/8 |
| 2006/0911953 | | 6/2006 | Kato et al. | |
| 2014/0225811 | A1 * | 8/2014 | Killguss | ................. B60K 35/00 345/7 |
| 2018/0308397 | A1 * | 10/2018 | Sugimoto | ............ G02B 27/017 |

(Continued)

FOREIGN PATENT DOCUMENTS

| JP | 2008-52852 A | 3/2008 |
|---|---|---|
| JP | 2013-200325 A | 10/2013 |

(Continued)

OTHER PUBLICATIONS

Chinese language office action dated Sep. 14, 2020, issued in application No. TW 109104908.

(Continued)

*Primary Examiner* — Rockshana D Chowdhury
(74) *Attorney, Agent, or Firm* — McClure, Qualey & Rodack, LLP

(57) ABSTRACT

A head-mounted display device includes a display assembly, a rotating assembly, and a fixed assembly. The rotating assembly is connected to the display assembly and includes a motor holder, a motor and a first connecting element. The motor is disposed on the motor holder. The first connecting element has a first accommodating portion and a second accommodating portion, wherein the first connecting element receives a part of the motor and the second connecting element receives a part of the motor holder. The fixed assembly is connected to the rotating assembly. The rotating assembly rotates the display assembly relative to the fixed assembly.

11 Claims, 14 Drawing Sheets

(56) References Cited

U.S. PATENT DOCUMENTS

2019/0138049 A1* 5/2019 Serota .................... G06F 1/163
2020/0033601 A1* 1/2020 Magrath ................. G06F 3/011

FOREIGN PATENT DOCUMENTS

| JP | 2016-63460 A | 4/2016 | | |
|---|---|---|---|---|
| JP | 2020-504989 A | 2/2020 | | |
| WO | WO-2018179509 A1 * | 10/2018 | ............. | G02B 27/02 |

OTHER PUBLICATIONS

Japanese language office action dated Jan. 4, 2022, issued in application No. JP 2020-176877.

\* cited by examiner

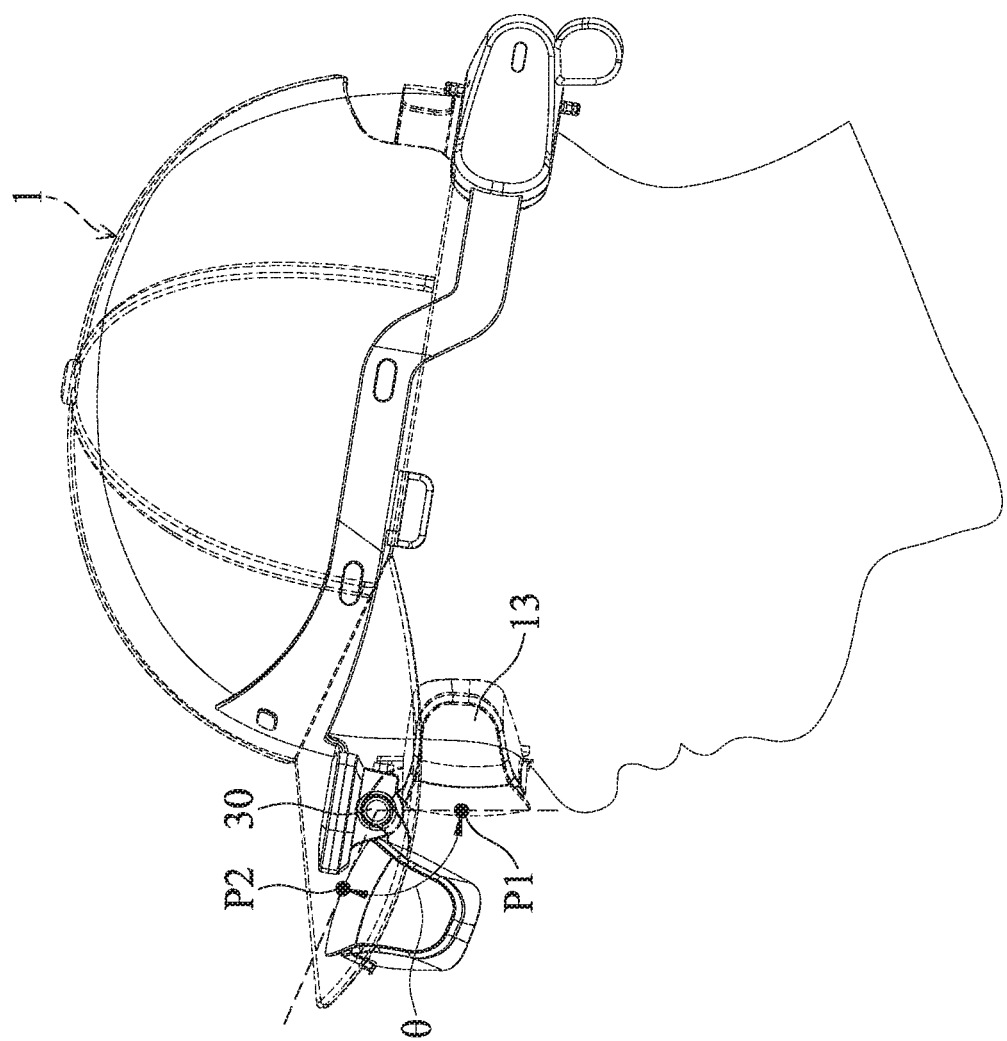
FIG. 13
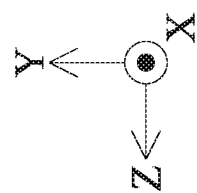

HEAD-MOUNTED DISPLAY DEVICE

CROSS-REFERENCE TO RELATED APPLICATIONS

The present application claims priority to Taiwan Patent Application No. 109104908, filed Feb. 17, 2020, which is incorporated by reference herein in their entirety.

BACKGROUND OF THE DISCLOSURE

Field of the Disclosure

The present disclosure relates to a head-mounted device, and more particularly to a head-mounted display device.

Description of the Related Art

Nowadays virtual reality (VR) and augmented reality (AR) technologies have been gradually applied to consumer electronic products, such as virtual reality display devices and augmented reality glasses, and the current virtual reality or augmented reality display device are usually head-mounted display devices, which are convenient for the user because they do not have to be held in their hands. Common head-mounted display devices are mostly in the form of helmets, glasses, or goggles. It is not only limited to the usage timing of the daily life, but also inconvenient to wear during use. For example, if a user wants to take a short break, he must remove the entire device.

In view of this, an object of the present invention is to provide a head-mounted display device that solves the above problems, and not only has an unobtrusive appearance, but also allows the user to quickly and easily switch from a usage state to a non-usage state without removing the entire device.

BRIEF SUMMARY OF THE DISCLOSURE

An embodiment of the invention provides a head-mounted display device, which includes a display assembly, a rotating assembly connected to the display assembly, and a fixed assembly connected to the rotating assembly, wherein the rotating assembly rotates the display assembly relative to the fixed assembly. The rotating assembly includes a motor holder, a motor disposed on the motor holder, and a first connecting element having a first accommodating portion and a second accommodating portion, wherein the first accommodating portion accommodates a part of the motor, and the second accommodating portion accommodates a part of the motor holder.

According to some embodiments of the present disclosure, the motor holder has a first through hole and a first protruding hollow structure, and the motor has an output shaft, and the output shaft is inserted into the first accommodating portion through the first through hole, and the first protruding hollow structure is inserted into the second accommodating portion. The rotating assembly further includes a second connecting element, and the second connecting element has a protruding portion and an accommodating portion, and the motor holder further has a second through hole and a second protruding hollow structure, and the protruding portion is inserted into the second through hole, and the second protruding hollow structure is inserted into the accommodating portion. The first connecting element and the second connecting element have a hook respectively, and the hooks are engaged with the display assembly. A rotation of the output shaft of the motor via the first connecting element makes the display assembly rotate between a first position and a second position. The display assembly is rotated at an angle of 110 degrees between the first position and the second position. The display assembly is rotated at an angle greater than 110 degrees between the first position and the second position. The display assembly is rotated at an angle less than 110 degrees between the first position and the second position.

According to some embodiments of the present disclosure, the motor has a plurality of positioning portions, the motor holder has a plurality of positioning holes, and the positioning portions correspond to the positioning holes to allow the motor to be disposed on the motor holder. The motor is a planetary gear reducer motor.

According to some embodiments of the present disclosure, the fixed assembly has a main body portion, and the motor holder is connected to the main body portion. The main body portion is hat-shaped.

BRIEF DESCRIPTION OF THE DRAWINGS

Aspects of this disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 13 is a side view of a head-mounted display device worn on a user's head according to an embodiment of the present disclosure.

DETAILED DESCRIPTION OF THE DISCLOSURE

Figure 1:
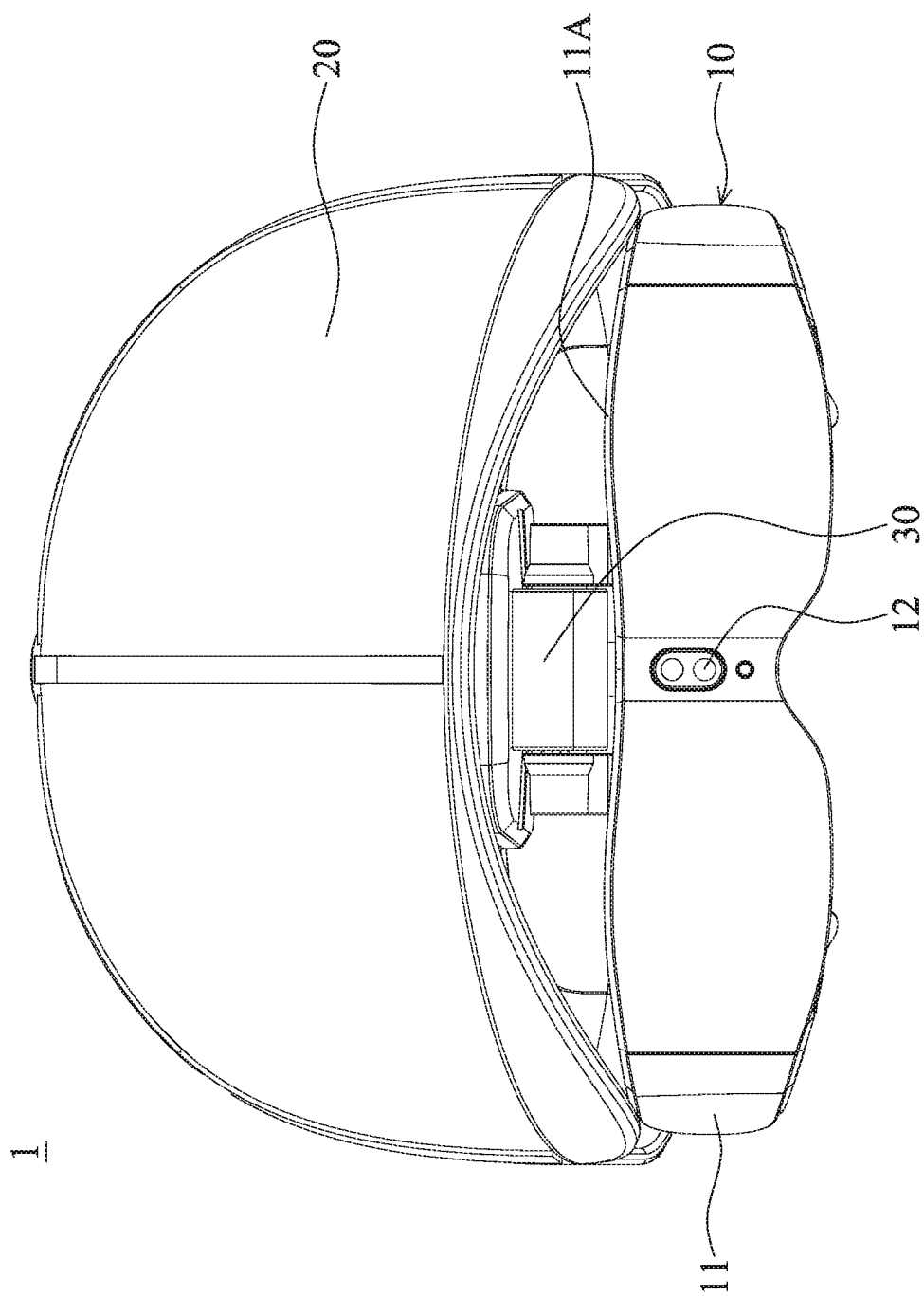
FIG. 1 is a perspective view of a head-mounted display device according to an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean+/− 20% of the stated value, more typically +/−10% of the stated value and even more typically +/−5% of the stated value. The stated value of the present disclosure is an approximate value. When there is no specific description, the stated value includes the meaning of "about" or "substantially".

Figure 2:
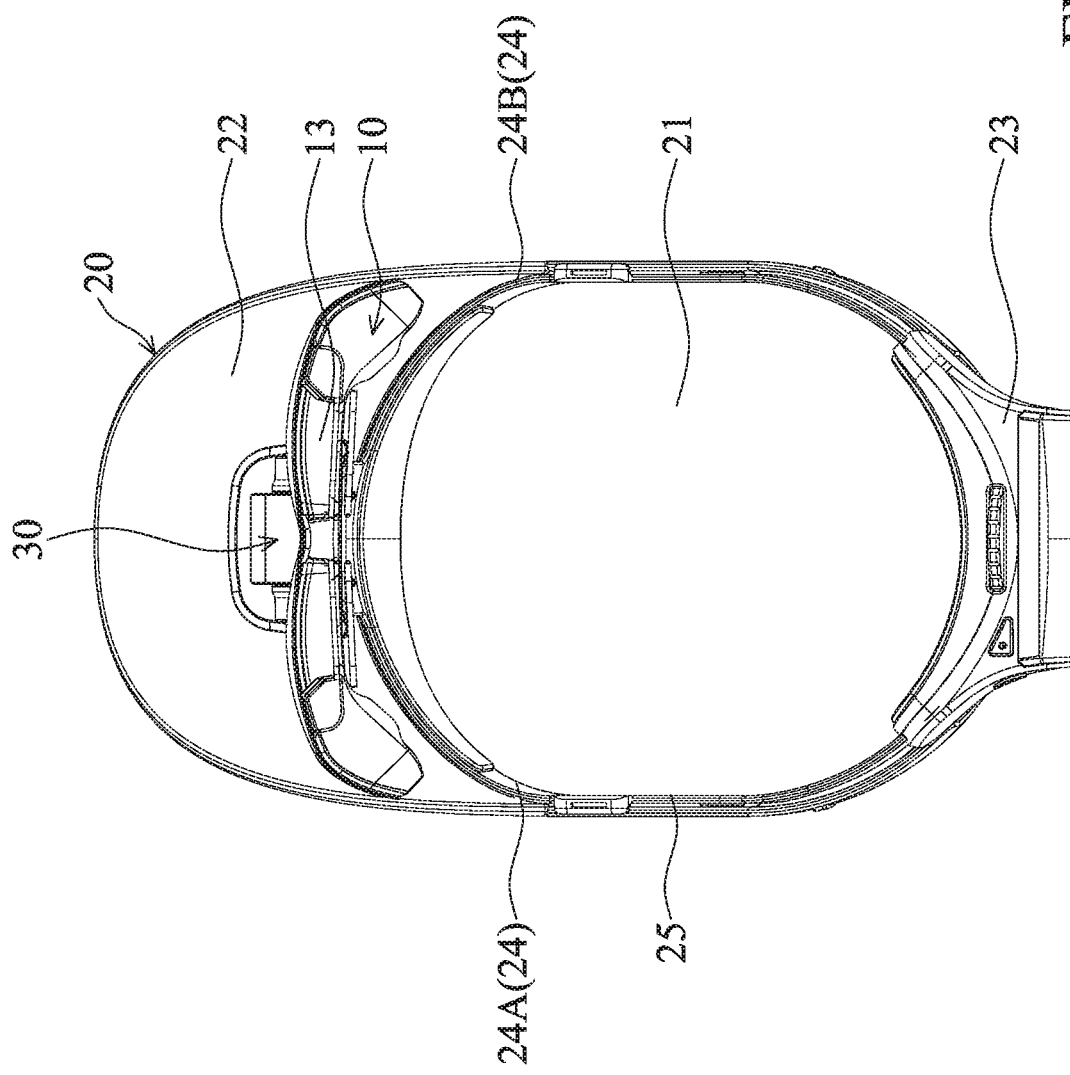
FIG. 2 is a bottom view of a head-mounted display device according to an embodiment of the present disclosure.
Figure 3:
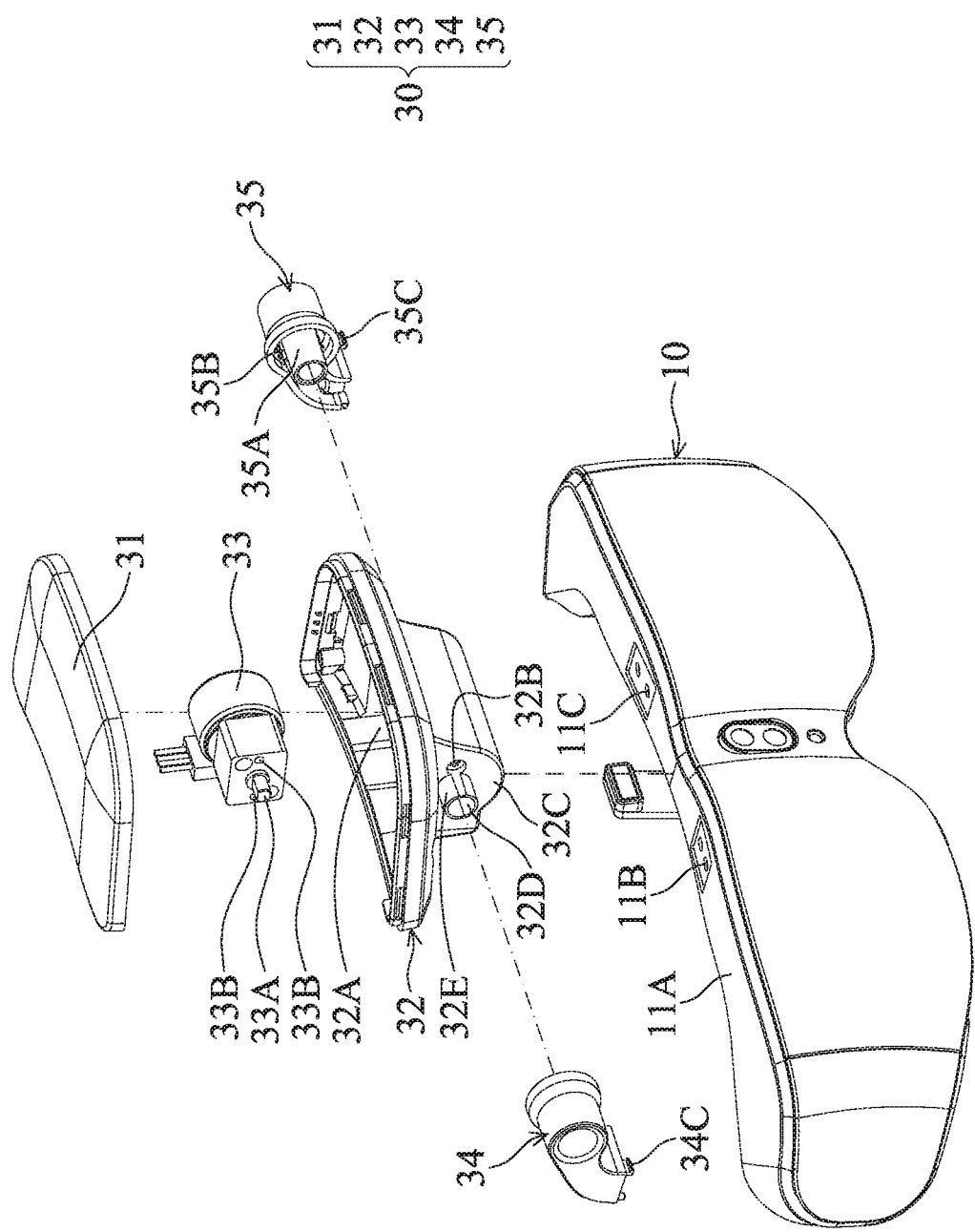
FIG. 3 is an exploded view of a head-mounted display device according to an embodiment of the present disclosure.

Refer to FIG. 1. FIG. 1 is a perspective view of a head-mounted display device 1 according to an embodiment of the present disclosure. The head-mounted display device 1 includes a display assembly 10, a rotating assembly 30, and a fixed assembly 20. The display assembly 10 includes an outer frame 11, an image capturing portion 12, and a display screen 13 or an optical machine (as shown in FIG. 2). The outer frame 11 has an upper surface 11A and a plurality of holes 11B and 11C (as shown in FIG. 3). The image capturing portion 12 and the display screen 13 are disposed on the outer frame 11. The image capturing portion 12 may capture external images. In addition, the image capturing portion 12 may also include a camera, a GPS, wireless positioning, etc., configured to detect a spatial position or orientation. The display screen 13 may be, for example, a liquid-crystal display (LCD), a light-emitting diode (LED) display (such as an OLED display or a Micro LED display), or other similar devices, which project the screen to the user's eye. The display assembly 10 may further include a motion sensor (not shown). The motion sensor may be an accelerometer (such as a gravity sensor), a gyroscope (such as a gyroscope sensor), or any sensor that may detect a linear movement, a linear movement direction, and rotational movement (such as rotational angular velocity or rotational angle) of the head-mounted display device 1.

Refer to FIG. 2. FIG. 2 is a bottom view of the head-mounted display device 1 according to an embodiment of the present disclosure. The fixed assembly 20 includes a main body portion 21, a front edge portion 22, a selective counterweight portion 23, a transmission portion 24, and a head-mounted portion 25. The main body portion 21 covers a head of a user, and the front edge portion 22 extends outward from the main body portion 21. The counterweight portion 23 is disposed relative to the display screen 13 to balance the weight of the display assembly 10 when the user wears the head-mounted display device 1. The counterweight portion 23 may include a counterweight, a control unit, a battery, etc. (all not shown). The control unit generates information and transmits the information to the display screen 13 via the transmission portion 24. The transmission portion 24 may be electrically connected to the counterweight portion 23 through the plurality of transmission lines (or cables) 24A and the flexible circuit board 24B, and extends from the counterweight portion 23 to the front edge part 22, and then electrically connected to other devices in the front edge portion 22 to transmit information. In a preferred embodiment, the head-mounted portion 25, the transmission portion 24 and the counterweight portion 23 are covered by the main body portion 21 or overlapped with the main body portion 21. The head-mounted portion 25 may adjust a wearing position and tightness according to different users. In the embodiment of the present invention, the main body portion 21 and the front edge portion 22 may be combined into a hat with a brim. With such a design, it is more comfortable when wearing the head-mounted display device 1. In addition, the head-mounted display device also has a better appearance since the counterweight portion 23, the transmission portion 24, and the head-mounted portion 25 are hidden inside the main body portion 21.

Refer to FIG. 3. FIG. 3 is an exploded view of the head-mounted display device 1 according to an embodiment of the present disclosure. The rotating assembly 30 is connected to the display assembly 10 and the fixed assembly 20 is connected to the rotating assembly 30. The rotating assembly 30 is used to rotate the display assembly 10 relative to the fixed assembly 20. The rotating assembly 30 includes an upper cover 31, a motor holder 32, a motor 33, a first connecting element 34, and a second connecting element 35. The upper cover 31 and the motor holder 32 are combined to form a casing to protect the motor 33. The upper cover 31 is connected to the fixed assembly 20. More specifically, the upper cover 31 may be connected to a lower side of the front edge portion 22 of the fixed assembly 20 (as shown in FIG. 1).

Figure 4:
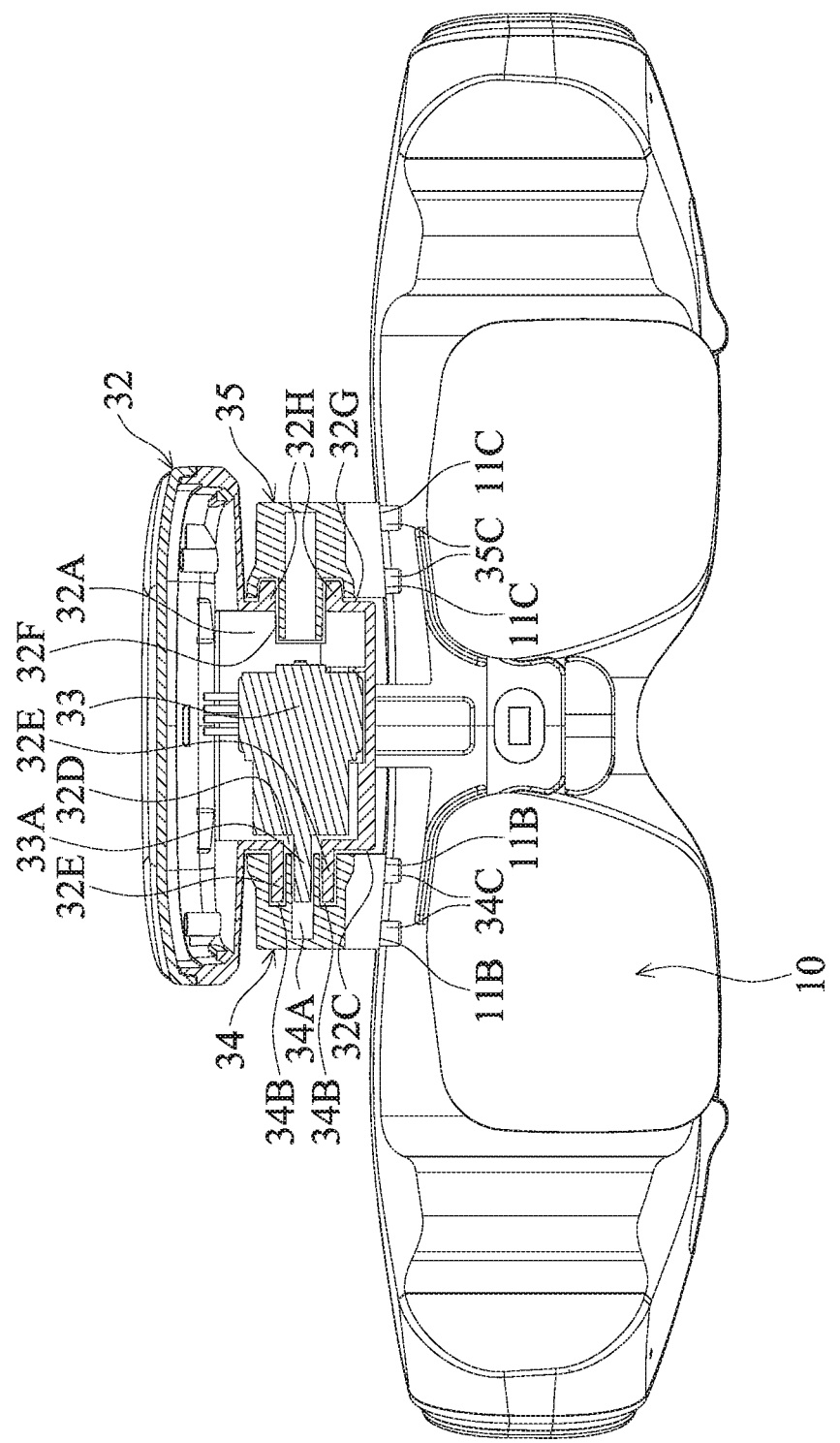
FIG. 4 is a front cross-sectional view of a partial structure of a head-mounted display device according to an embodiment of the present disclosure.
Figure 5:
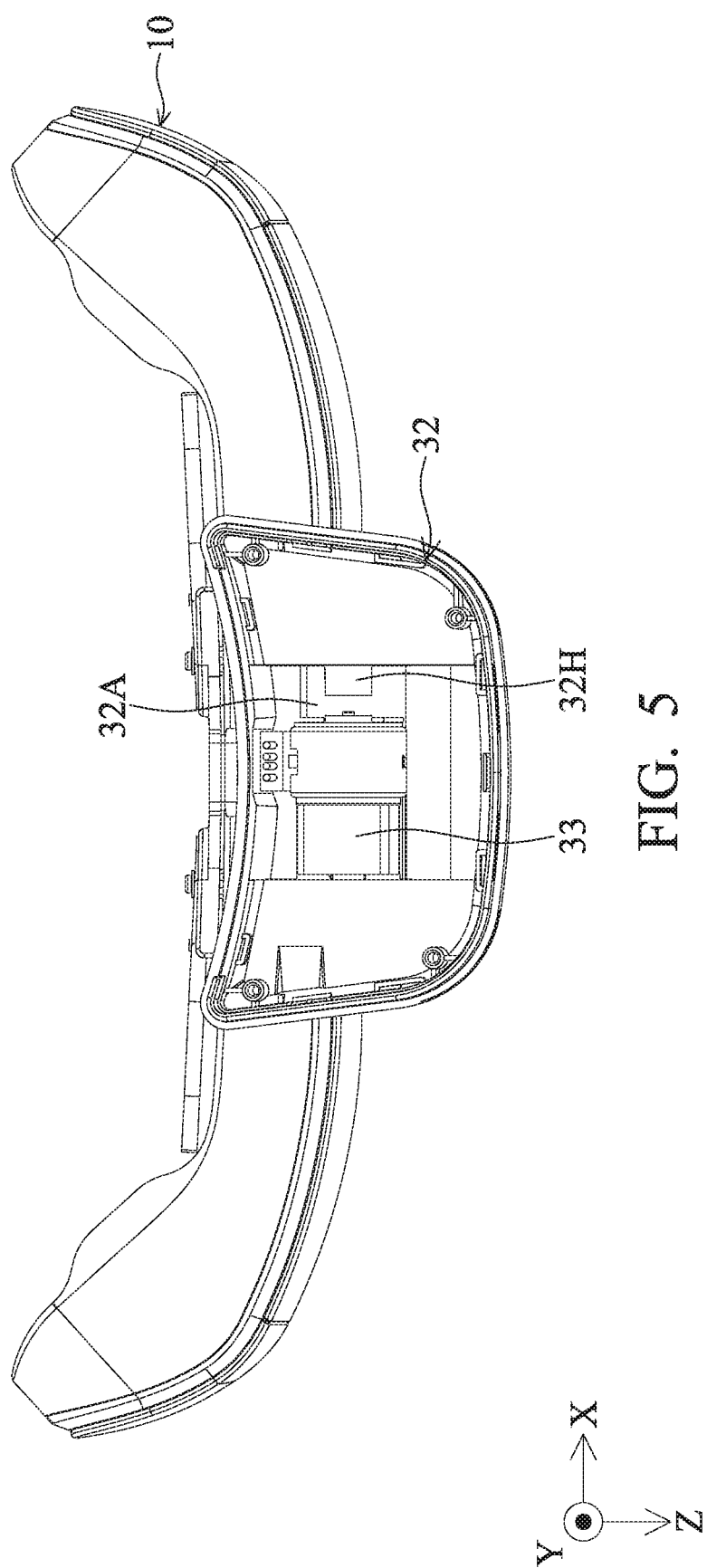
FIG. 5 is a top view of a partial structure of a head-mounted display device according to an embodiment of the present disclosure.
Figure 6:
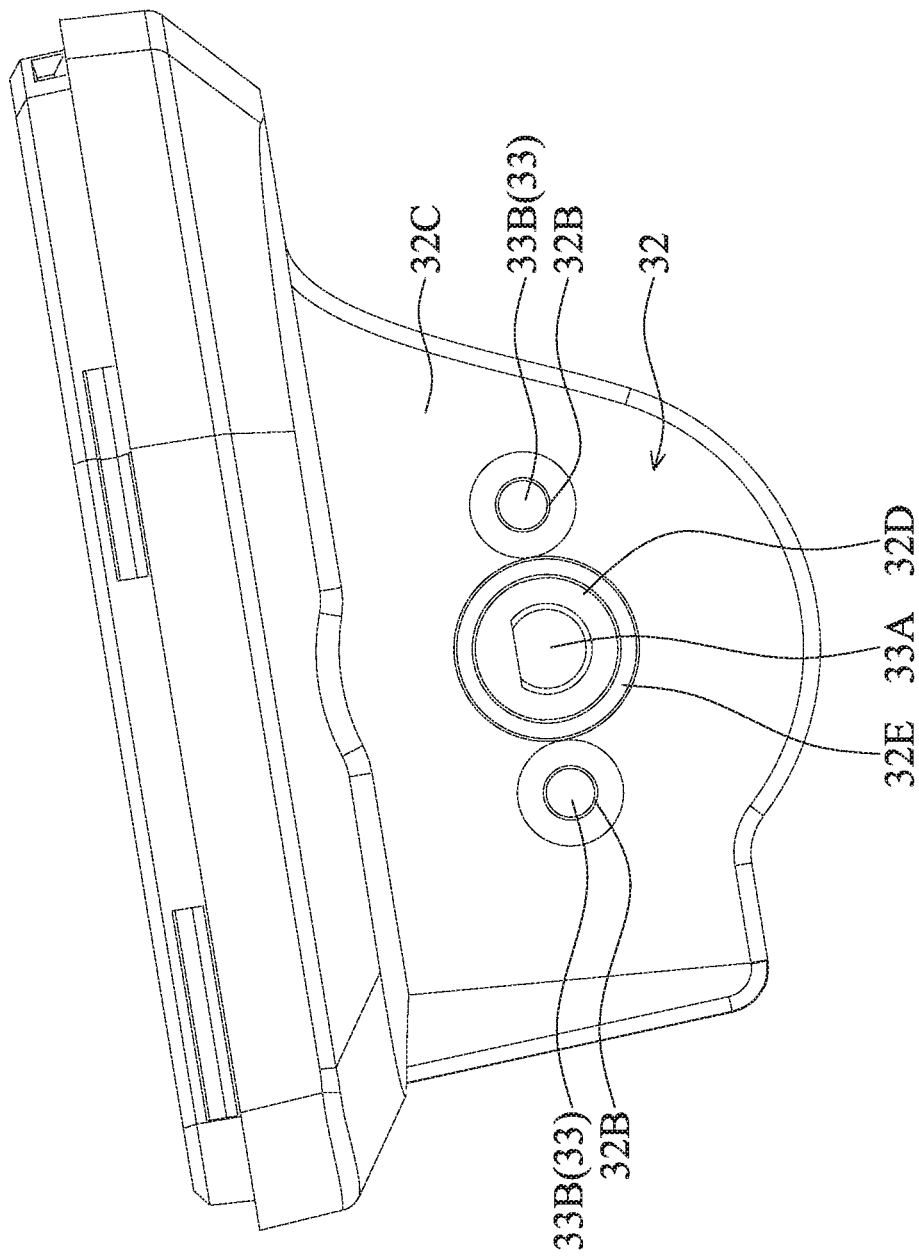
FIG. 6 is a schematic diagram of a partial structure of a head-mounted display device according to an embodiment of the present disclosure.

Refer to FIG. 3 to FIG. 6. FIG. 4 is a front cross-sectional view of a partial structure of the head-mounted display device 1 according to an embodiment of the present disclosure, FIG. 5 is a top view of a partial structure of the head-mounted display device 1, and FIG. 6 is a schematic diagram of a partial structure of the head-mounted display device 1 according to an embodiment of the present disclosure. As shown in FIGS. 3 and 4, the motor holder 32 has a receiving portion 32A, a plurality of positioning holes 32B, a first outer side surface 32C, a first through hole 32D, a first protruding hollow structure 32E, a second through hole 32F, a second outer side surface 32G, and a second protruding hollow structure 32H. The motor 33 has an output shaft 33A and a plurality of positioning portions 33B.

As shown in FIG. 5, the motor holder 32 has a receiving portion 32A corresponding to the shape of the motor 33. For example, the motor 33 may be fixed on the motor holder 32 by dispensing adhesive on the receiving portion 32A. In addition, as shown in FIG. 6, the plurality of positioning holes 32B of the motor holder 32 correspond to the plurality of positioning portions 33B of the motor 33 to allow the motor 33 to be disposed on the motor holder 32. In a specific embodiment, the positioning portion 33B of the motor is a cavity with an internal thread, so a screw (not shown) may be used to fix the motor 33 and the motor holder 32. More specifically, the screw is screwed into the positioning portion 33B of the motor 33 through the positioning hole 32B from the outside of the motor holder 32. In this way, the motor 33 is further fixed to the motor holder 32.

As shown in FIG. 4, the long axis direction of the output shaft 33A of the motor 33 is parallel to the long axis direction of the display screen 13 of the display assembly 10. In an embodiment, the motor 33 uses a planetary gear reducer motor because the planetary gear reducer motor is small and light, and the motor and the reducer are integrally formed. In addition, after selecting the appropriate reduction ratio according to the required load, the speed provided by the motor may be reduced by the reducer to achieve the purpose of increasing torque. Therefore, compared with the general mechanical rotating mechanism, the use of the motor 33 may not only improve loading capacity, but also have better positioning ability.

Figure 7:
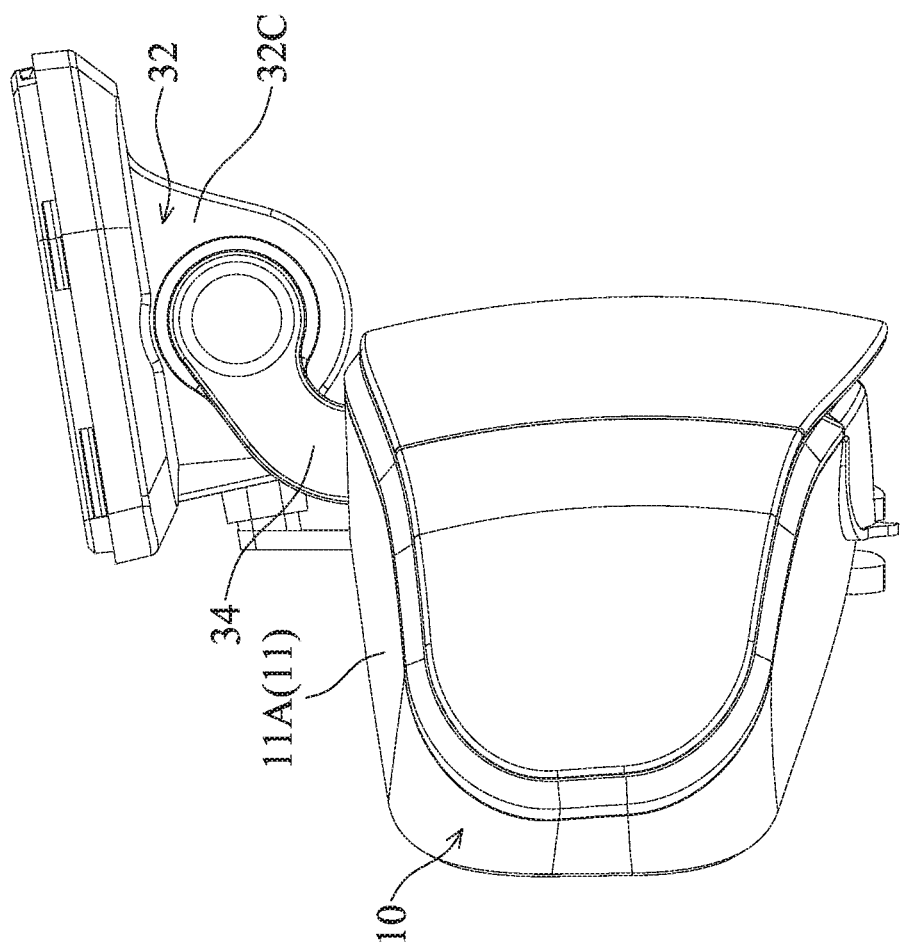
FIG. 7 is a left side view of a partial structure of a head-mounted display device according to an embodiment of the present disclosure.
Figure 7:
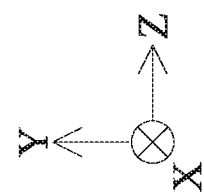
Figure 8:
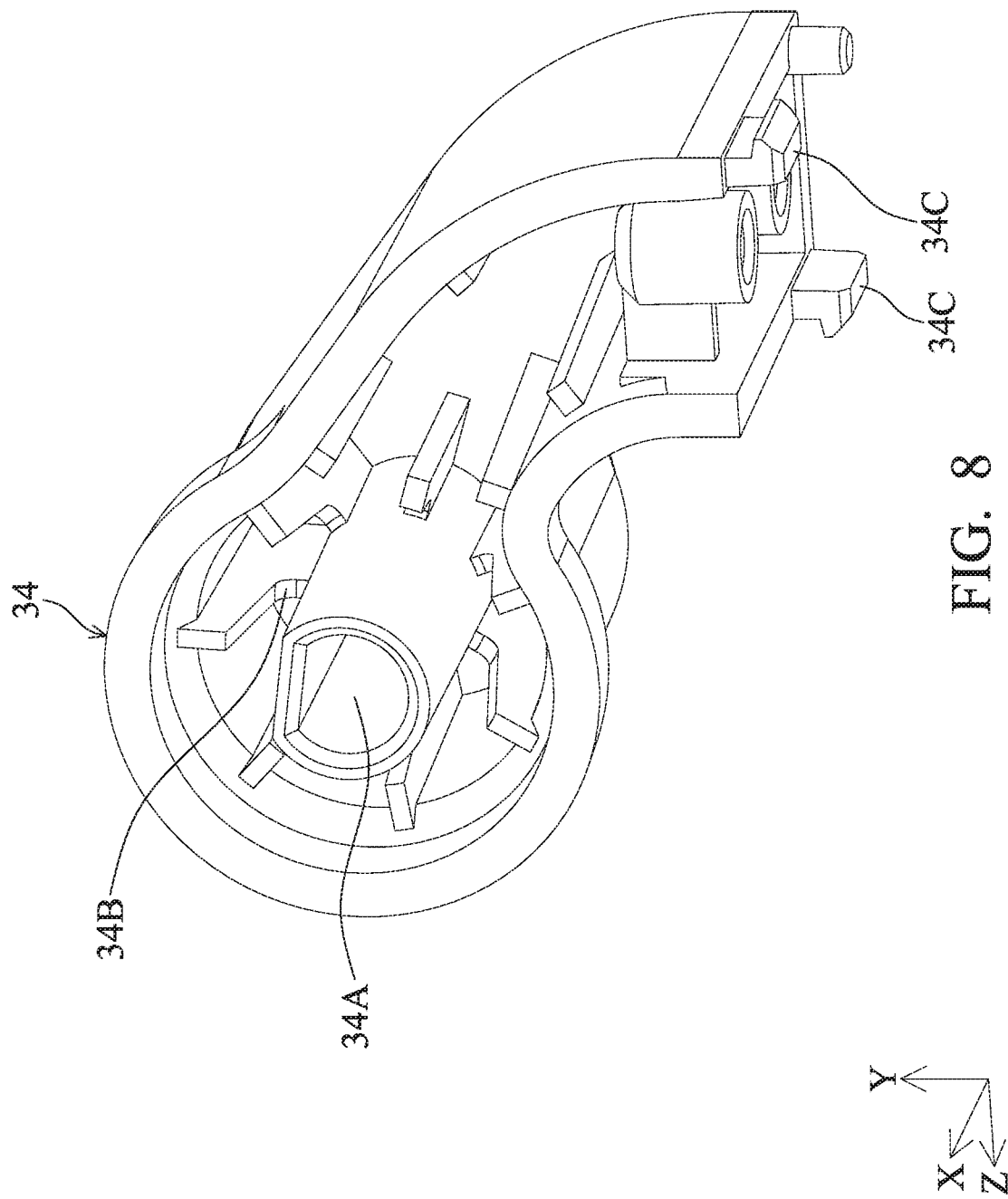
FIG. 8 is a schematic diagram of a first connecting element according to an embodiment of the present disclosure.

Refer to FIG. 4, and FIGS. 6 to 8. FIG. 7 is a left side view of a partial structure of the head-mounted display device 1 according to an embodiment of the present disclosure, and FIG. 8 is a schematic diagram of the first connecting element 34 of the embodiment. As shown in FIG. 7, the first connecting element 34 is connected to the first outer side surface 32C of the motor holder 32 and to the upper surface 11A of the outer frame 11 of the display assembly 10. As shown in FIG. 8, the first connecting element 34 has a first accommodating portion 34A, a second accommodating portion 34B and a hook 34C. The first accommodating portion 34A accommodates a part of the motor 33, and the second accommodating portion 34B accommodates a part of the motor holder 32.

The connection of the first connecting element 34 to the display assembly 10 is described in more detail. As shown in FIG. 4, the hook 34C of the first connecting element 34 is engaged with the hole 11B on the outer frame 11 of the display assembly 10 (as shown in FIG. 3).

The connection of the first connecting element 34 to the motor holder 32 and the motor 33 is described in more detail. As shown in FIGS. 4 and 6, the first through hole 32D and the first protruding hollow structure 32E of the motor holder 32 are located on the first outer side surface 32C, and the first protruding hollow structure 32E surrounding the first through hole 32D protrudes outwardly. The output shaft 33A of the motor 33 is inserted into the first accommodating portion 34A of the first connecting element 34 through the first through hole 32D of the motor holder 32, and the first protruding hollow structure 32E of the motor holder 32 is also inserted into the second accommodating portion 34B of the first connecting element 34. By this arrangement, the first connecting element 34 connects the motor 33 and the motor holder 32.

In addition, in the embodiment of the present invention, the cross-sectional shape of the output shaft 33A of the motor 33 is not circular. For example, it may be semicircular. The first accommodating portion 34A of the first connecting element 34 cooperates with the cross-sectional shape and size of the output shaft 33A of the motor 33, so that the motor 33 and the first connecting element 34 are in a tightly matched state after the output shaft 33A is inserted into the first accommodating portion 34A. In other words, the torque output by the output shaft 33A of the motor 33 may drive the first connecting element 34, causing the first connecting element 34 to rotate accordingly.

Figure 9:
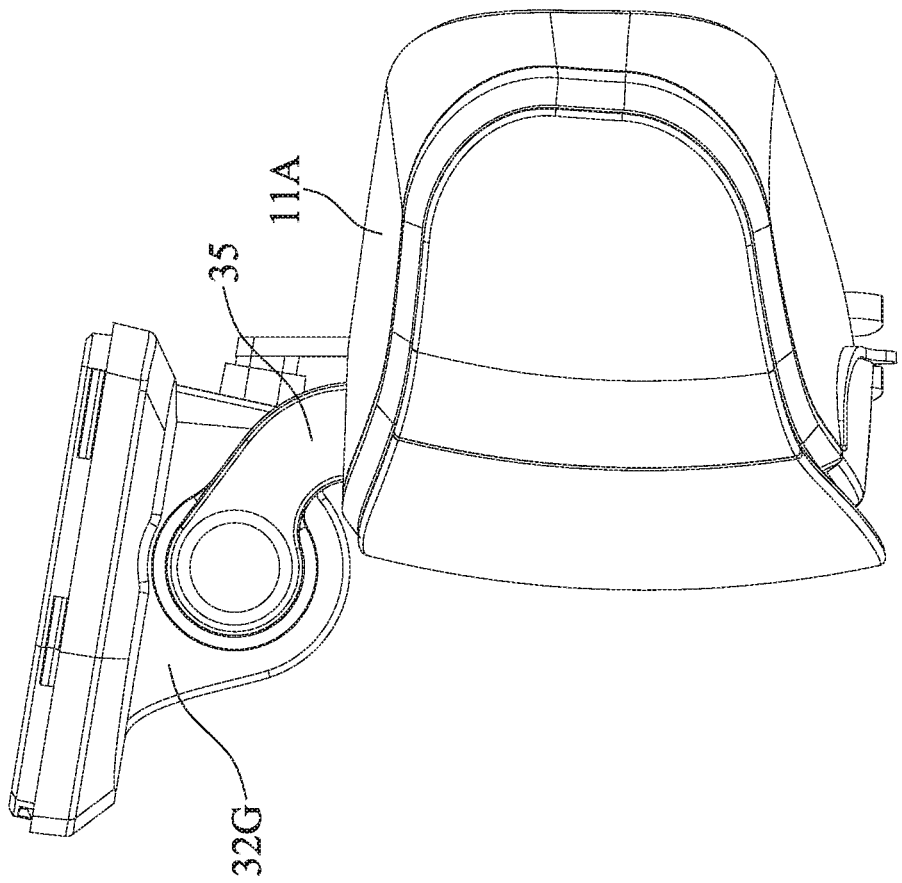
FIG. 9 is a right side view of a partial structure of a head-mounted display device according to an embodiment of the present disclosure.
Figure 10:
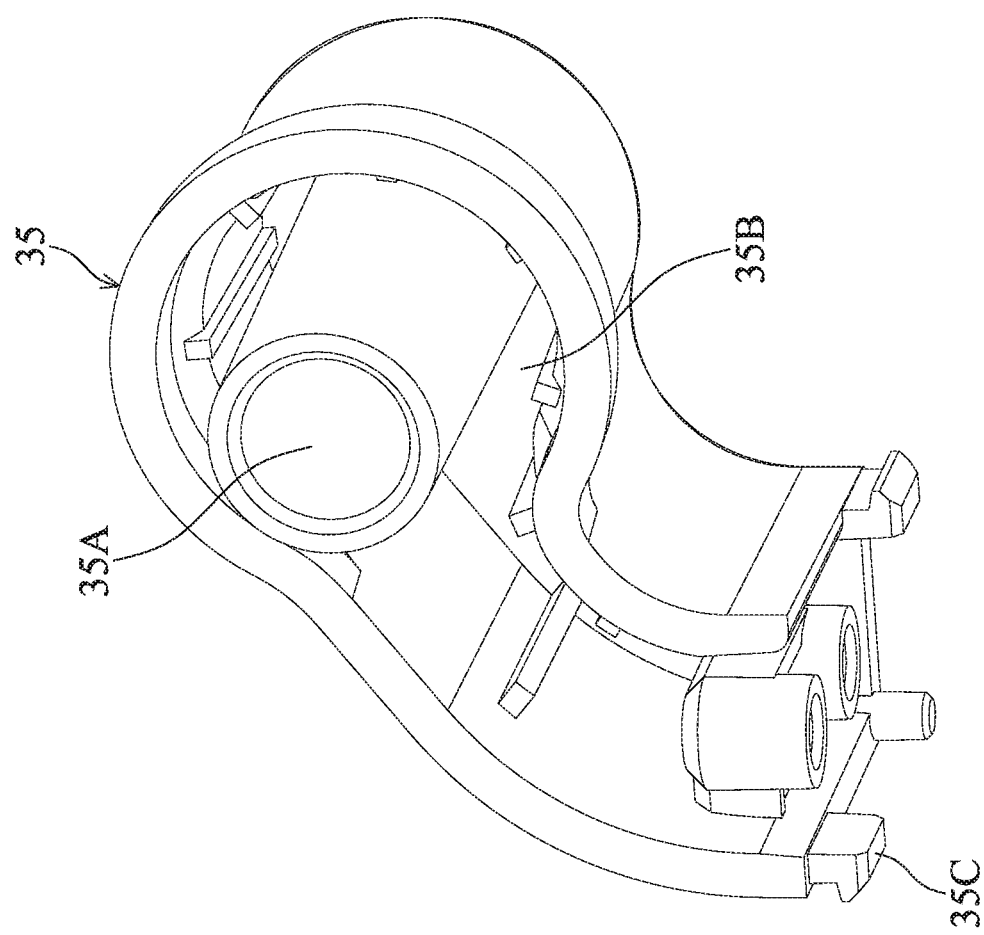
FIG. 10 is a schematic diagram of a second connecting element according to an embodiment of the present disclosure.

Refer to FIG. 4 and FIGS. 9 to 10. FIG. 9 is a right side view of a partial structure of the head-mounted display device 1 according to an embodiment of the present disclosure, and FIG. 10 is a schematic diagram of the second connecting element according to an embodiment of the present disclosure. As shown in FIG. 9, the rotating assembly 30 may further include a second connecting element 35 connected to a second outer side surface 32G of the motor holder 32, and the second outer side surface 32G is opposite to the first outer side surface 32C. The second connecting element 35 is connected to the upper surface 11A of the outer frame 11 of the display assembly 10. As shown in FIG. 10, the second connecting element 35 has a protruding portion 35A, an accommodating portion 35B and a hook 35C.

The connection of the second connecting element 35 to the display assembly 10 is described in more detail. As shown in FIG. 4, similar to the first connecting element 34, the hook 35C of the second connecting element 35 is engaged with the hole 11C on the outer frame 11 of the display assembly 10. In addition, in another embodiment, after the engagement described above, the first connecting element 34, the second connecting element 35 and the display assembly 10 may be further fixed by the screws to enforce the connecting.

The connection of the second connecting element 35 to the motor holder 32 is described in more detail. As shown in FIG. 4, the second through hole 32F and the second protruding hollow structure 32H of the motor holder 32 are located on the second outer side surface 32G, and the second protruding hollow structure 32H surrounding the second through hole 32F protrudes outwardly. The protruding portion 35A of the second connecting element 35 is inserted into the second through hole 32F of the motor holder 32, and the second protruding hollow structure 32H of the motor holder 32 is inserted into the accommodating portion 35B of the second connecting element 35, so that the second connecting element is connected to the motor holder 32.

As can be seen from the description above, since the second connecting element 35 is not directly connected to the motor 33, the second connecting element 35 is merely used to aid in connecting the motor holder 32 to the display assembly 10 during the rotation of the rotating assembly 30. In other words, the transmission of the motor 33 is transmitted to the whole body via the first connecting element 34, and the second connecting element 35 is passively rotated accordingly. Therefore, in some embodiments, the second connecting element 35 may not be provided.

Figure 11:
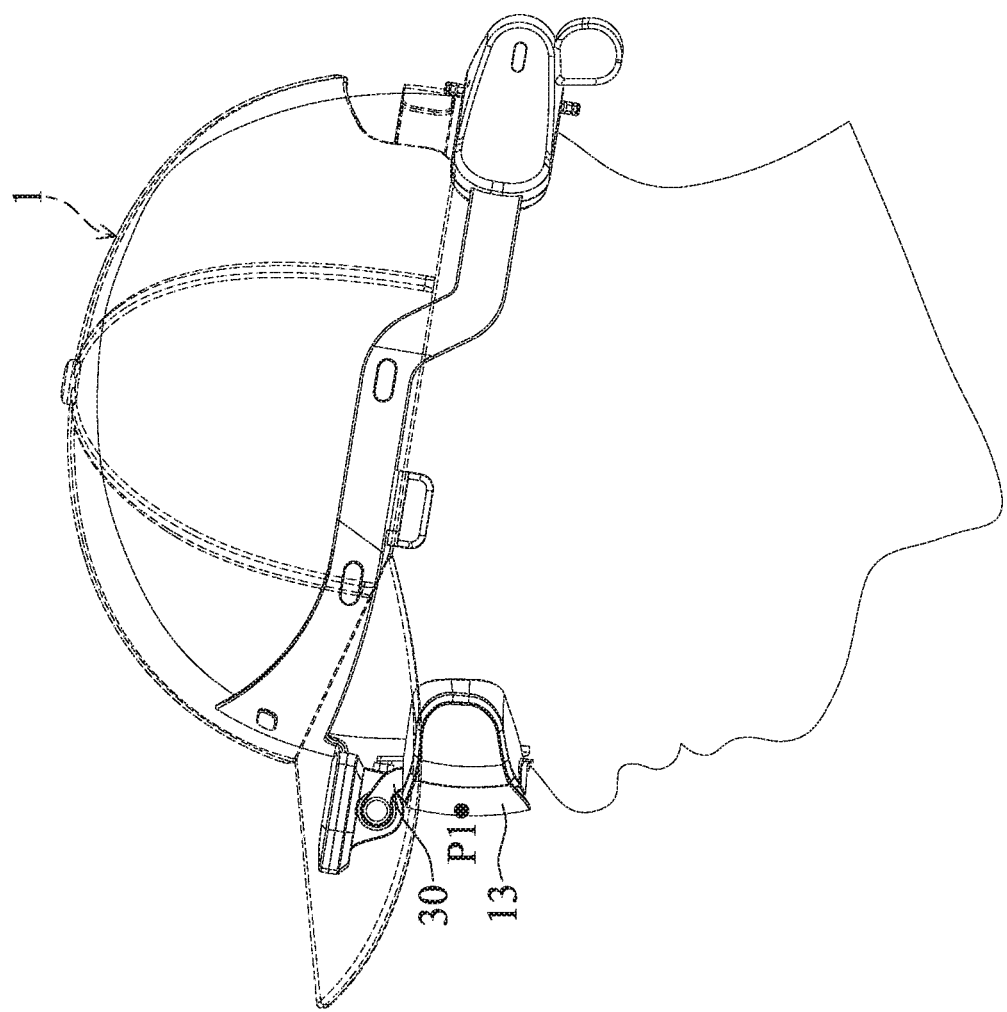
FIG. 11 is a side view of a head-mounted display device worn on a user's head according to an embodiment of the present disclosure.
Figure 12:
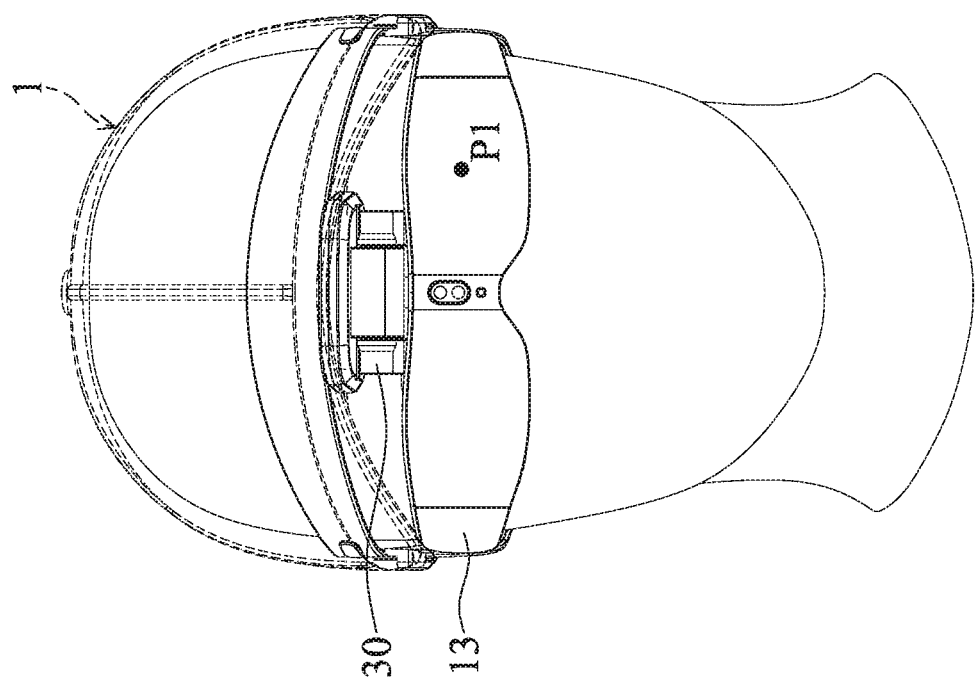
FIG. 12 is a front view of a head-mounted display device worn on a user's head according to an embodiment of the present disclosure.
Figure 12:
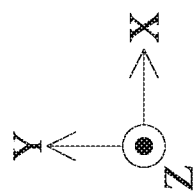
Figure 14:
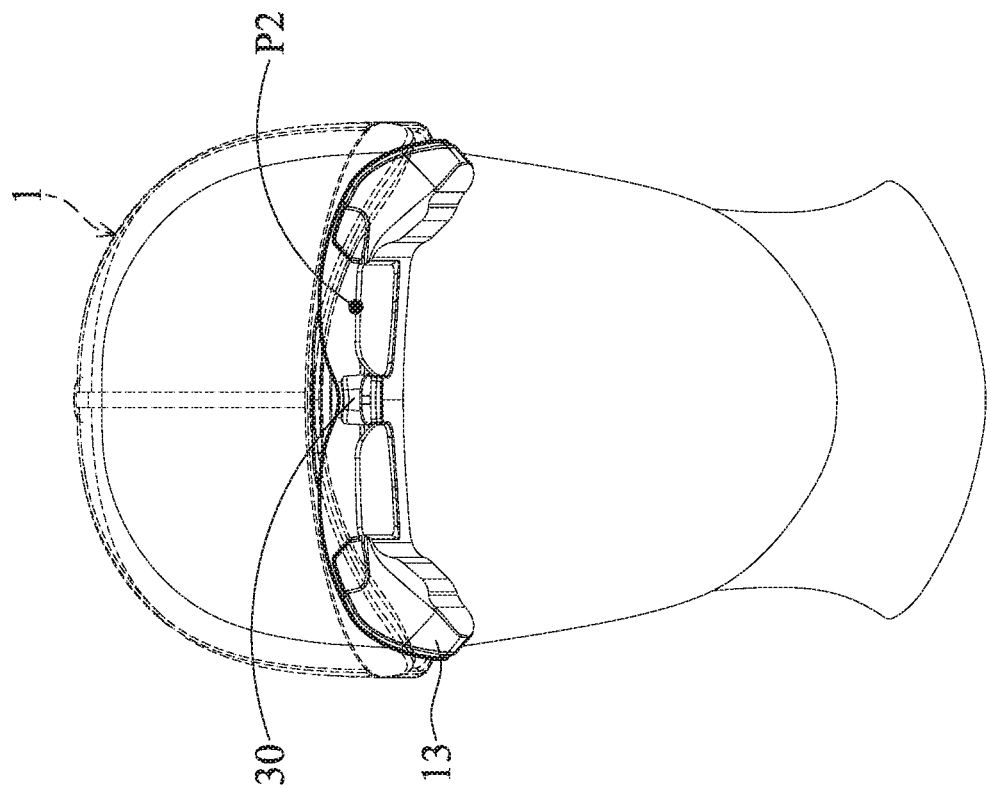
FIG. 14 is a front view of a head-mounted display device worn on a user's head according to an embodiment of the present disclosure.

Refer to FIGS. 11 to 14, the operation of the rotating assembly 30 will be described. FIGS. 11 and 13 are side views of the head-mounted display device 1 worn on a user's head according to an embodiment of the present disclosure, and FIGS. 12 and 14 are front views of a head-mounted display device 1 worn on a user's head according to an embodiment of the present disclosure. First, as shown in FIGS. 11 and 12, when the user uses the head-mounted display device 1, the display screen 13 is located at a first position P1. When the head-mounted display device 1 is not in use by the user, the user may control the rotating assembly 30 to allow the display screen 13 to move from the first position P1 to a second position P2, as shown in FIGS. 13 and 14.

The method of controlling the rotating assembly 30 may be through a sensor of the display assembly 10, the sensor may detect the user's voice or motion, and then drive the motor 33. Therefore, the user may use voice control or touch control to drive the motor 33 to rotate the display assembly 10 from the first position P1 to the second position P2. More specifically, the motor 33 is actuated after being driven, so that the output shaft 33A outputs a torque, which is greater than the weight of the display assembly 10. Therefore, the output shaft 33A outputs a torque and rotates at an angle θ, then the first connecting element 34 which is tightly matched with the output shaft 33A is also rotated at the same angle θ around the output shaft 33A, leading the display assembly 10 which is firmly connected to the first connecting element 34 to rotate at the same angle θ accordingly. Thus, the display screen 13 is rotated outward from the first position P1 located directly in front of the user's field of vision to the second position P2. The display screen 13 located at the second position P2 does not affect the user's field of vision, so that the user may normally do other activities.

When the user wants to continue to use the head-mounted display device 1, the user may use voice control or touch control to drive the motor 33, so that the output shaft 33A of the motor 33 outputs a torque and rotates in the opposite direction to the original rotation direction by the same angle θ, then the first connecting element 34 which is tightly matched with the output shaft 33A is also rotated in the same direction and the same angle θ around the output shaft 33A, leading the display assembly 10 which is firmly connected to the first connecting element 34 to rotate at the same angle θ accordingly. Thus, the display screen 13 is rotated inward from the second position P2 which is located above the user's field of view back to the first position P1 which is directly in front of the user's field of view. With this design, when the user does not want to use head-mounted display device 1 for a short time, the user may not need to remove the entire head-mounted display device 1, and just to control the rotating assembly 30 to move the display screen 13 away from the field of view. Therefore, it is more convenient in use.

In a specific embodiment, in addition to driving the motor 33 through voice control or touch control, a physical button may be provided at any position of the head-mounted display device 1 to send a signal to drive the motor 33. In a specific embodiment, the physical button may be disposed on the main body portion 21 or the front edge portion 22.

In some embodiments, considering the user's field of view, the angle θ rotated from the first position P1 to the second position P2 is 110 degrees, but the angle θ of rotation is not limited to this, and may be changed according to needs. For example, if the angle θ of the display screen 13 located at the first position P1 is 0 degrees, then the display screen 13 may also be rotated away from the user at an angle greater or less than 110 degrees, or the display screen 13 may also be rotated toward the user, that is, the angle θ of rotation is less than 0 degrees.

In addition, in the embodiment of the present invention, although the motor 33 drives the display screen 13 to rotate back and forth at two angles θ of 0 degrees and 110 degrees, but it is not limited to this, the motor 33 may drive the display screen 13 to move to multiple angles, according to need. Therefore, in terms of application, even if the users are different, the rotating assembly may be used to allow the motor 33 to drive the display screen 13 to move at an appropriate angle to achieve the most suitable viewing position for different users, and enhance the comfort of use.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A head-mounted display device, comprising:
   a display assembly;
   a rotating assembly, connected to the display assembly, comprising:
   a motor holder;
   a motor, disposed on the motor holder; and
   a first connecting element, having a first accommodating portion and a second accommodating portion, wherein the first accommodating portion accommodates a part of the motor, and the second accommodating portion accommodates a part of the motor holder; and
   a fixed assembly, connected to the rotating assembly;
   wherein the rotating assembly rotates the display assembly relative to the fixed assembly and
   wherein the fixed assembly has a main body portion, and the motor holder is connected to the main body portion.

2. The head-mounted display device as claimed in claim 1, wherein the motor holder has a first through hole and a first protruding hollow structure, and the motor has an output shaft, and the output shaft is inserted into the first accommodating portion through the first through hole, and the first protruding hollow structure is inserted into the second accommodating portion.

3. The head-mounted display device as claimed in claim 2, wherein the rotating assembly further comprises a second connecting element, and the second connecting element has a protruding portion and an accommodating portion, and the motor holder further has a second through hole and a second protruding hollow structure, and the protruding portion is inserted into the second through hole, and the second protruding hollow structure is inserted into the accommodating portion.

4. The head-mounted display device as claimed in claim 3, wherein the first connecting element and the second connecting element have a hook respectively, and the hooks are engaged with the display assembly.

5. The head-mounted display device as claimed in claim 4, wherein a rotation of the output shaft of the motor via the first connecting element makes the display assembly rotate between a first position and a second position.

6. The head-mounted display device as claimed in claim 5, wherein the display assembly is rotated at an angle of 110 degrees between the first position and the second position.

7. The head-mounted display device as claimed in claim 5, wherein the display assembly is rotated at an angle greater than 110 degrees between the first position and the second position.

8. The head-mounted display device as claimed in claim 5, wherein the display assembly is rotated at an angle less than 110 degrees between the first position and the second position.

9. The head-mounted display device as claimed in claim 1, wherein the motor has a plurality of positioning portions, the motor holder has a plurality of positioning holes, and the positioning portions correspond to the positioning holes to allow the motor to be disposed on the motor holder.

10. The head-mounted display device as claimed in claim 1, wherein the motor is a planetary gear reducer motor.

11. The head-mounted display device as claimed in claim 1, wherein the main body portion is hat-shaped.

* * * * *